Aug. 5, 1947.  G. A. DEAN  2,425,088
FAN BLADE AND MOUNTING MEANS THEREFOR
Filed Sept. 13, 1943  2 Sheets-Sheet 1
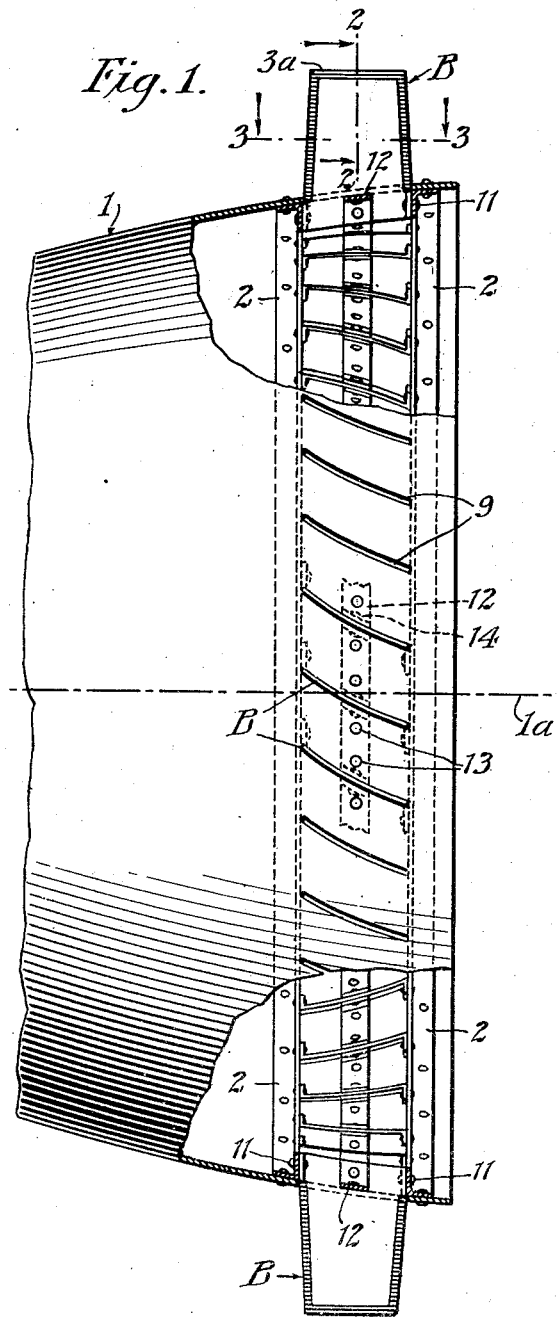
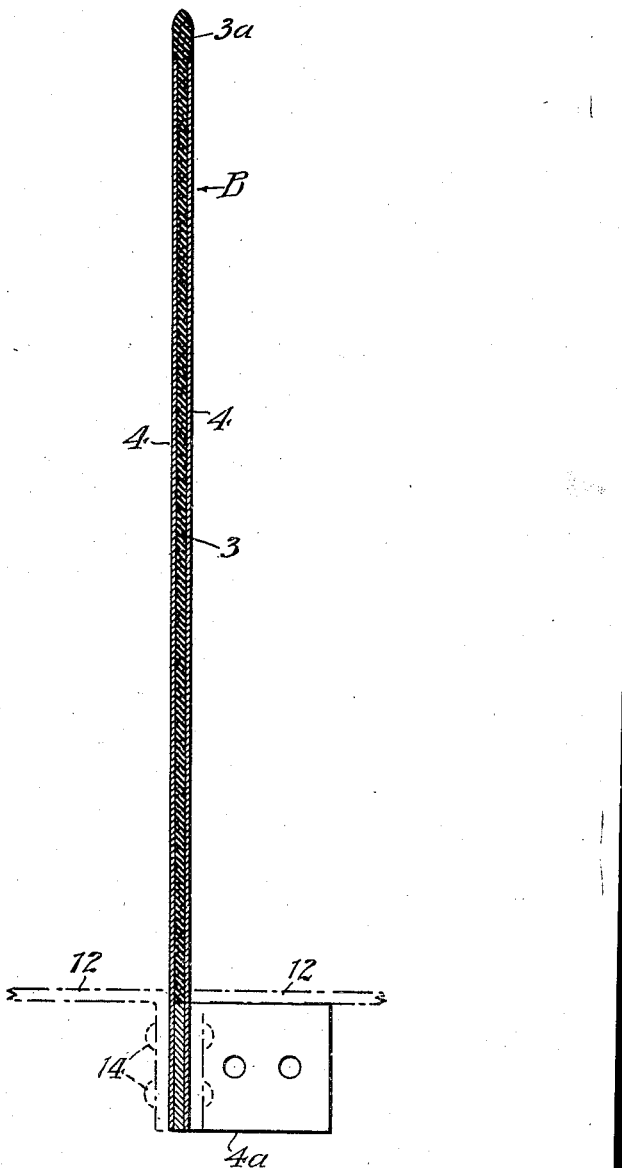
INVENTOR
George A. Dean
BY
ATTORNEY Aug. 5, 1947.   G. A. DEAN   2,425,088
FAN BLADE AND MOUNTING MEANS THEREFOR
Filed Sept. 13, 1943   2 Sheets-Sheet 2
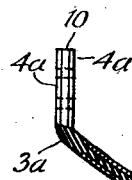
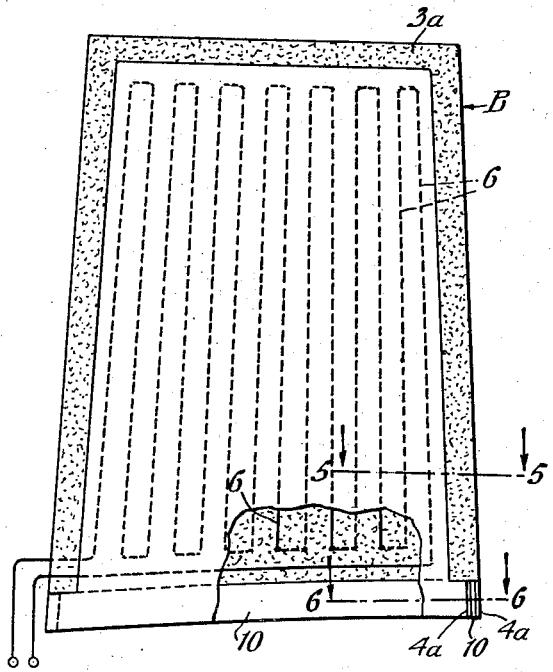
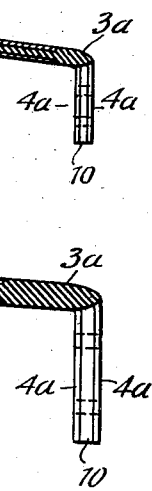
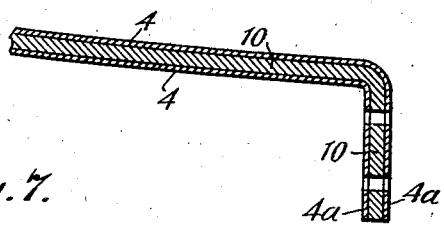
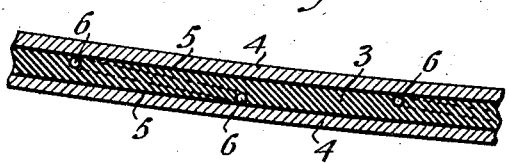
INVENTOR
George A. Dean
BY
ATTORNEY Patented Aug. 5, 1947

2,425,088

UNITED STATES PATENT OFFICE 2,425,088

FAN BLADE AND MOUNTING MEANS THEREFOR

George A. Dean, Radburn, N. J., assignor to Curtiss-Wright Corporation, a corporation of Delaware Application September 13, 1943, Serial No. 502,382

5 Claims. (Cl. 244—134)

My invention relates to fan blades and to an arrangement or means for mounting them in operative position.

My invention has particular reference to a fan blade of the laminated type wherein metal plates are disposed exteriorly of and secured to an intermediate sheet-like structure formed from plastic material.

My invention has further reference to a novel arrangement for securing a plurality of fan blades to a rotatable structure such, for example, as an aircraft spinner.

Various other objects, advantages and features of my invention will become apparent from the following detailed description.

My invention resides in the fan blade, mounting means therefor, arrangements and combinations of the character hereinafter described and claimed.

For an understanding of my invention and for an illustration of one of the many forms thereof, reference is to be had to the accompanying drawings, in which:

Figure 1 is an elevational view, partly in section, showing the fan blades and other features of my invention;

Fig. 2 is an enlarged, vertical sectional view taken on the line 2—2 of Fig. 1 looking in the direction of the arrows;

Fig. 3 is an enlarged, horizontal sectional view taken on the line 3—3 of Fig. 1 looking in the direction of the arrows;

Fig. 4 is an elevational view, partly broken away, showing a fan blade of my invention.

Figs. 5 and 6 are enlarged, horizontal sectional views taken on the respective lines 5—5 and 6—6 of Fig. 4 looking in the direction of the arrows; and Fig. 7 is an enlarged sectional view showing the fan blade of my invention.

My invention has general reference to fan blades utilizable for any desired purpose. More particularly, my invention relates to fan blades adapted to form the cooling fan for an aircraft engine. The following description has reference to blades arranged to form a fan rotor but it shall be understood that such blades, if desired, may form a fan stator.

Referring to Fig. 1, I have shown an aircraft spinner 1 which, as known in the art, is mounted for rotatable movement on a horizontal axis 1a. Riveted or otherwise suitably secured to the inner surface of the spinner 1 are spaced angle members 2, 2 which are disposed at right angles to said horizontal axis of the spinner 1. In the manner hereinafter described, the members 2, 2 are utilized for supporting fan blades B of novel character.

In accordance with the invention, each fan blade B is formed from an intermediate sheet-like structure 3 of molded plastic material, said structure 3 having secured thereto similar plates 4, 4 each of which is seated in a recess formed in one side of said structure 3. The plates 4, 4 are disposed opposite each other and the structure 3, at each edge of the fan blade and at the top thereof, projects outwardly beyond said plates 4, 4 as indicated at 3a. The thickness of this outer section 3a of the structure 3 is the same as the combined thickness of the plates 4, 4 and the section of the structure 3 engaged thereby. As shown in Fig. 4, the plates 4, 4 extend downwardly beyond the structure 3 and the lower ends thereof terminate in the two sets of transverse sections 4a which extend in opposite directions, respectively.

As shown particularly in Fig. 7, the plates 4, 4 are separated from the structure 3 by the respective binder layers 5, 5.

In accordance with one form of the invention, the structure 3 supports an electrical resistance unit adapted, when energized, to supply heat to the fan blade, said unit being formed from a continuous resistance conductor or wire 6 which, preferably, has its sections extending lengthwise of the fan blade in suitable spaced relation. As shown, alternate wire sections are disposed closely adjacent the respective plates 4, 4 from which they are separated by the aforesaid binder layers 5, 5 respectively. By reason of this alternate arrangement of the wire sections, each plate 4 may be said to have its own heating means or to have a heating means disposed closely adjacent thereto. The terminals of the wire 6 may be suitably mounted on the fan blade and connected in circuit relation in a desired manner as will be understood by those skilled in the art.

The hereinbefore described structure 3 is formed from suitable plastic or synthetic material such, for example, as a phenol condensation product, synthetic rubber or the like and it should be of such character that it is highly resistant to the action of grease or oil. The plates 4, 4 are formed from suitable metallic material such, for example, as steel or aluminum preferably the latter. The binder layers 5, 5 are formed from suitable material as known in the art for binding a plastic material to a metal surface. In the example shown and, preferably, the binder material is formed by grinding the same kind of material from which the structure 3 is formed and mixing the same in a suitable solvent. The binder layers 5, 5 should be good conductors of heat and of electricity-insulating character.

The fan blade B is produced by a molding operation in a manner which will be understood by those skilled in the art. Briefly, as regards this operation, a sheet of plastic or synthetic material having suitable thickness has a resistance unit comprising the wire 6 associated therewith in the general manner hereinbefore described. Thereupon, one of the plates 4 is disposed in the mold and a binder layer 5 applied thereto. At this time, the sheet of plastic or synthetic material last described is disposed in the mold in proper contacting relation with said last named plate 4. Thereupon, after one surface of the other plate 4 has had a binder layer 5 applied thereto, the coated surface thereof is properly engaged with said sheet of plastic or synthetic material. Subsequently, the mold is closed and the molding operation effected in the usual manner in order to produce the fan blade B herein disclosed wherein the binder layers 5 effectively secure the plates 4, 4 in position as shown, said binder layers 5 having the added function of electrically insulating the wire 6 from the plates 4, 4 while permitting the ready transmission of heat thereto from said wire 6.

The hereinbefore described spinner 1, between the angle members 2, 2 thereof, is provided with slots 9, Fig. 1, into which extend the respective lower sections of the fan blades B. The spaced sections of the plates 4 and 4, below the structure 3, together with the two sets of transverse sections 4a have a filler piece 10 disposed therein. These sets of transverse sections 4a extend, respectively, in opposite directions and flushly engage the interior surfaces of the respective angle members 2, 2 to which they are secured by rivets 11 or the like whereby the fan blades B are securely fastened in position as indicated in Fig. 1. If desired and preferably, angle members 12, extending circumferentially of the spinner 1, are disposed in engagement with the interior surface thereof and are secured thereto by rivets 13, or equivalent. Each member 12 is disposed between two adjacent fan blades B and the angular ends thereof are riveted, as indicated at 14, to the respective lower sections of the plates 4 of the aforesaid adjacent fan blades B. In this manner, the spinner sections between adjacent pairs of slots are supported and reinforced so as to prevent transverse movement thereof.

Accordingly, in the manner described above, the fan blades B are secured to the spinner 1 for rotatable movement therewith. Each blade B comprises an electrical resistance unit as disclosed and the terminals of all the resistance units are connected in circuit with a suitable source of electrical energy, for example, in the manner disclosed in the pending application of Everett P. Palmatier, Serial No. 496,234, filed July 26, 1943.

The arrangement described above constitutes a fan rotor and, as stated, it is adapted to supply cooling air to the aircraft engine. During flight of the aircraft, if ice should form on the fan blades B, the aforesaid circuit may be closed to supply current to the heating conductors 6 of the respective fan blades B. These conductors 6 are disposed in good heat-transferring relation with respect to the plates 4, 4 and the heat which is transferred thereto, resulting from closure of said electrical circuit, effectively heats each plate 4 to such extent that accumulated ice thereon is eliminated.

Should the aircraft pilot obtain knowledge that he is approaching an area wherein icing conditions may exist, the described electrical circuit may be closed before such area is reached to thereby heat the fan blades in advance and positively prevent the formation of ice on such blades.

Although the fan blade of my invention has been described in connection with the resistance unit comprising the conductor 6, it shall be understood that the invention is not to be so limited. Thus, if desired, each fan blade may be constructed without using a conductor 6. If this is done, the resulting fan blade operates as satisfactorily as if the conductor 6 were incorporated therein for supplying cooling air to the aircraft engine.

Fan blades constructed in accordance with my invention are advantageous from a number of viewpoints. The blades are readily produced by the described molding operation in a simple and convenient manner. The incorporated plastic sheet causes each blade to be self-dampening as regards vibrations which would be otherwise set up during operation of the fan. The metallic sheets form a housing for the plastic sheet to protect it from abrasion or other damage.

In the appended claims, the expression "de-icing" shall be understood as describing true de-icing wherein that ice is melted which, previously, had been formed on the fan blades and said expression shall also be considered as describing an operation wherein the fan blades are subjected to the action of an agent which positively prevents the formation of ice thereon.

While I have described the fan blades B as forming a fan rotor, it shall be understood that, either with or without the heating conductors 6, they may be used to form a fan stator.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A fan blade having metallic plates disposed in facing relation, and a sheet of plastic material between said plates and adhering thereto, said plates having substantially uniform thickness and said sheet of plastic material having substantially uniform thickness in a direction extending longitudinally of said fan blade and also in a direction extending transversely thereof, the uniform thickness of said sheet of plastic material being greater than that of said plates, said sheet of plastic material, at opposite edges of said fan blade, extending beyond said plates and terminating in thickened sections.

2. A fan blade having metallic plates disposed in facing relation, a sheet of plastic material between said plates and adhering thereto, said plates having substantially uniform thickness and said sheet of plastic material having substantially uniform thickness in a direction extending longitudinally of said fan blade and also in a direction extending transversely thereof, the uniform thickness of said sheet of plastic material being greater than that of said plates, said sheet of plastic material, at opposite edges of said fan blade, extending beyond said plates and terminating in thickened sections, and electrical heating means incorporated in said plastic material.

3. A fan blade having metallic plates disposed in spaced substantially parallel relation, the inner ends of said plates comprising a mounting zone for the fan blade, and a plastic core between said plates and adhering thereto, said core including thickened leading and trailing edge portions extending beyond the edges of the metallic plates.

4. A fan blade having metallic plates, disposed in spaced substantially parallel relation, the inner ends of said plates comprising a mounting zone for the fan blade, and a plastic core between said plates and adhering thereto, said core including thickened leading and trailing edge portions extending beyond the edges of the metallic plates, said thickened leading and trailing edge portions of said core having a thickness substantially equal to the thickness of the central portion of said core plus the thickness of said metallic plates.

5. A fan blade comprising a substantially planar plastic member formed to blade planiform and camber and having leading and trailing edge portions thicker than the intermediate portions of said member, said intermediate portions comprising recesses on both sides of the plastic member, and substantially planar metallic plates bonded to said plastic member inwardly of said leading and trailing edges and occupying said recesses, said plates defining the major exposed surface of said fan blade, and the inner ends of said plates comprising mounting means for said fan blade.

GEORGE A. DEAN.

REFERENCES CITED

The following references are of record in the file of this patent:

UNITED STATES PATENTS

| Number | Name | Date |
|---|---|---|
| 2,110,621 | Cohen | Mar. 8, 1938 |
| 2,245,759 | Chrisman | June 17, 1941 |
| 1,990,979 | Chilton | Feb. 12, 1935 |
| 2,234,319 | Preston | Mar. 11, 1941 |
| 2,330,622 | Ramshorn | Sept. 28, 1943 |
| 1,479,494 | Beck | Jan. 1, 1924 |
| 1,737,912 | Bogard | Dec. 3, 1929 |
| 2,274,845 | Ogg | Mar. 3, 1942 |
| 2,130,156 | Rollefson | Sept. 13, 1938 |
| 1,136,827 | Montgomery | Apr. 20, 1915 |
| 1,929,690 | Huntman | Oct. 10, 1933 |
| 2,232,670 | Barrett | Feb. 18, 1941 |

FOREIGN PATENTS

| Number | Country | Date |
|---|---|---|
| 196,126 | Switzerland | Feb. 28, 1938 |
| 492,801 | Great Britain | Sept. 27, 1938 |
| 641,922 | Germany | Feb. 17, 1937 |
| 518,873 | Great Britain | Mar. 11, 1940 |
| 848,062 | France | July 17, 1939 |
| 823,447 | France | Jan. 20, 1938 |
| 538,547 | Great Britain | Aug. 7, 1941 |